United States Patent

Larsson

[11] 4,032,129
[45] June 28, 1977

[54] ADJUSTABLE TENSION SPRING ANCHOR

[76] Inventor: Karl H. Larsson, 433 Granite Ave., Monrovia, Calif. 91016

[22] Filed: Apr. 26, 1976

[21] Appl. No.: 680,181

[52] U.S. Cl. .............................. 267/179; 85/1 F; 85/8.8

[51] Int. Cl.² .......................................... F16F 1/12

[58] Field of Search .......... 267/179, 175, 177, 178, 267/166; 85/9 R, 8.8, 1 F

[56] References Cited

UNITED STATES PATENTS

| 773,733 | 11/1904 | Greene | 85/8.8 |
|---|---|---|---|
| 1,079,925 | 11/1913 | Prather | 267/179 |
| 1,117,534 | 11/1914 | Tilson | 267/179 |
| 1,224,582 | 5/1917 | Vandegrift | 85/9 R |
| 2,769,606 | 11/1956 | Larson | 85/9 R |
| 2,867,287 | 1/1959 | Armstrong | 267/179 |
| 3,248,996 | 5/1966 | Larson | 85/9 R |

FOREIGN PATENTS OR APPLICATIONS

| 1,407,600 | 6/1965 | France | 85/9 R |
| 379,230 | 8/1964 | Switzerland | 85/1 F |

Primary Examiner—James B. Marbert
Attorney, Agent, or Firm—Boniard I. Brown

[57] ABSTRACT

An adjustable tension spring anchor adapted to be mounted to a moving or a substantially stationary member comprising an elongated threaded cylindrical body member having at least one distal end thereof formed with an extending flat head member, the head member being provided with a central aperture in which one end of a tension spring is received therein. Various uses are contemplated wherein a plurality of anchors can be arranged in several ways to be interconnected to respective tension springs, the anchors being either positioned in axial alignment with each other or at various angular arrangements thereto, depending on the use and location of the tension spring. An alternative embodiment is also included wherein the threads on the body member are substituted for annular grooves adapted to receive removable snap rings therein.

8 Claims, 8 Drawing Figures

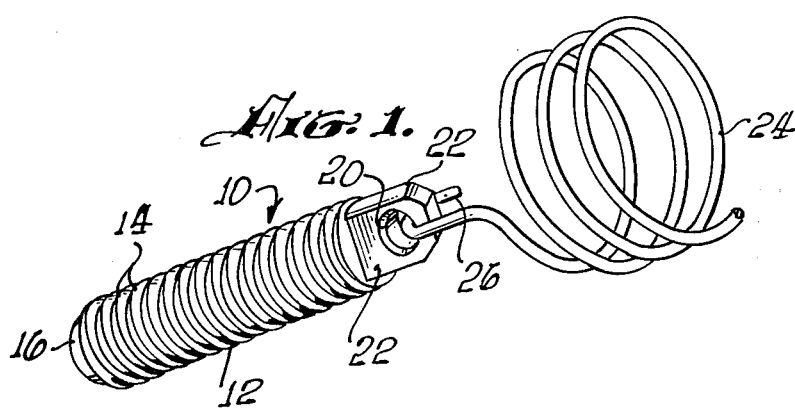
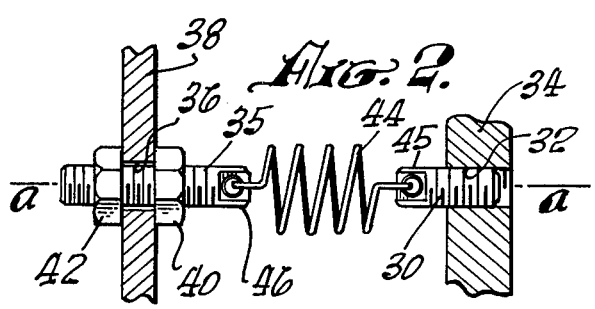
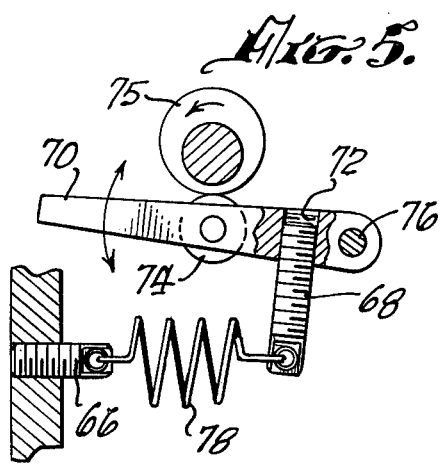
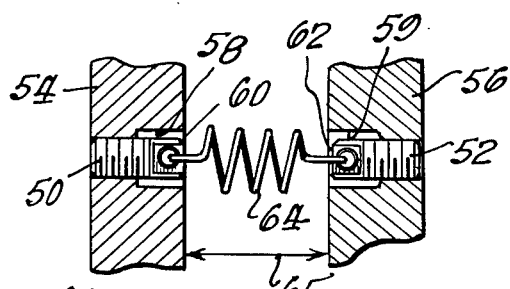
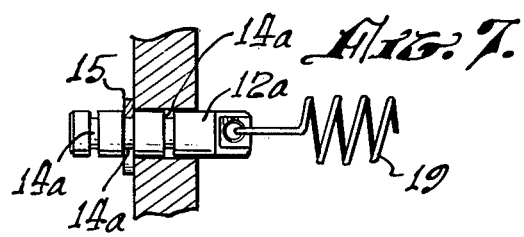
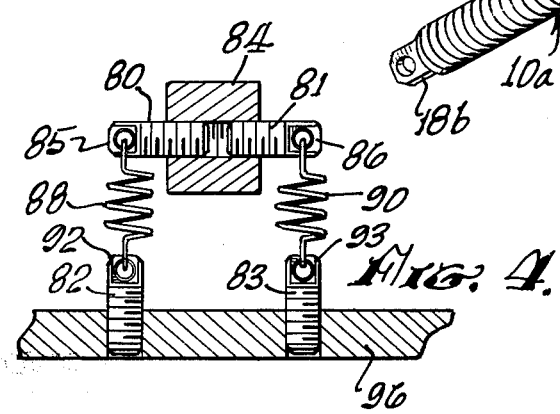
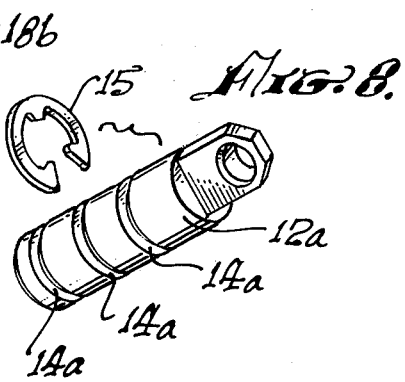

ADJUSTABLE TENSION SPRING ANCHOR

BACKGROUND OF THE INVENTION

1. Field of the Invention

This invention relates generally to a means for adjusting tension springs and, more particularly, to an adjustable anchor adapted to have tension springs attached thereto for fine adjustment in the tension thereof.

2. Description of the Prior Art

As is well known in the prior art, various problems and difficulties have been and still are being encountered in providing suitable means for mounting tension springs in very close spaces, and further provide a means to adjust the tension of the spring once it has been installed.

Very often, during designing and building of machinery, there arises a problem wherein biasing means are required between two or more parts, but the area is such that it would require a special device. Further there are many occasions where the tension of springs between certain members must be adjusted very accurately after the spring is installed. This also creates a need for a specially designed spring or spring and related elements. Generally, when a spring needs to be adjusted, the spring must be constantly removed and the connecting elements are then adjusted —hopefully, to the proper amount to provide the needed tension after the spring is replaced. This becomes very time-consuming and costly.

SUMMARY OF THE INVENTION

The present invention comprises an adjustable tension spring anchor which is so designed as to be mounted in areas that were heretofore not possible, to permit the installation of the well known coil tension spring rather than requiring a specially designed spring device. The anchor is formed having an elongated body member defining a shaft that is threaded throughout its length. At least one distal end of the body is provided with an integrally formed spring mounting head member having a central aperture disposed therein to receive one end of the tension spring mounting head member having a central aperture disposed therein to receive one end of the tension spring. There will be occasions wherein the body member will include a mounting head at each end of the body.

Thus, the variety of uses and areas to which it can be employed are numerous. That is, one anchor can be used with other elements in connecting the spring; or, two or more anchors can be arranged in various positions as might be needed, wherein the anchors can be employed in axial alignment or at angular displacement to each other, having the respective spring interconnecting each anchor.

Accordingly, the anchors are adapted to be mounted to fixed or movable members whereby, under certain arrangements, the spring does not have to be removed from the anchors to be adjusted as is the case in most uses of coil springs.

Another embodiment is also included having the elongated body provided with annular grooves to accommodate a compatible snap ring for positioning the anchor in place. This also provides a firmer foundation for the anchor.

OBJECTS AND ADVANTAGES OF THE INVENTION

The present invention has for an important object a provision wherein the tension of a spring, particularly a coil spring, can be adjusted in a simple manner allowing the spring to be used in areas not accessible to this type of tension spring.

It is another object of the invention to provide an adjustable tension spring anchor that is relatively small in size and is yet capable of being used under heavy spring tension loads.

It is still another object of the invention to provide an adjustable tension spring anchor that has versatile uses and arrangements.

It is a further object of the invention to provide an adjustable tension spring anchor wherein the anchors can be axially or angularly aligned to each other, having a spring inter-connected therebetween and adjustable, —regardless of its position.

It is a still further object of the invention to provide a device of this character that is easy to service and install.

Still another object of the invention is to provide a device of this character that is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

FIG. 1 is a perspective view of the adjustable tension spring anchor, illustrating a coil spring attached thereto;

FIG. 2 is a side-elevational view of the anchors as they would be mounted in an axial alignment with each other and showing one anchor being mounted in a different manner than the other anchor;

FIG. 3 is a view illustrating the anchors disposed within recesses which are used when the area therein is limited;

FIG. 4 is a view of the present invention showing a plurality of anchors arranged in a tandem spring hookup;

FIG. 5 is an illustration showing another arrangement of the anchors used in conjunction with a lever arm device;

FIG. 6 is a perspective view of an anchor having each end thereof provided with spring mounting heads;

FIG. 7 is in an alternative arrangement of the anchor body having an annular groove disposed therein; and FIG. 8 is a perspective view thereof with the snap ring being separated therefrom.

DESCRIPTION OF THE PREFERRED EMBODIMENT

Referring more particularly to FIG. 1, there is shown an adjustable tension spring anchor, generally indicated at 10, wherein the anchor comprises an elongated body member 12, being cylindrical in shape. The member as indicated herein includes an adjustable securing means comprising external threads 14 formed along the full length of the outer cylindrical wall thereof, one end terminating as a free threaded end 16, while the oppositely disposed distal end thereof is provided with a spring mounting head member, designated at 18. Said mounting head member is adapted with an aperture 20 formed through the enlarged flat surfaces 22. The coil tension spring, generally indicated at 24, is well known in the art and includes an extending attaching leg member 26 which is bent in a substantially U-shaped form and received through aperture 20 as shown.

It should be readily understood that the length of the threaded body 12 may vary according to each particular application of the device. This is well illustrated in the various accompanying figures such as those shown in FIG. 2, wherein spring mounting anchor 30 is shown threaded in bore 32 which is disposed in member 34. In this particular application, anchor 30 is first threaded in bore 32 and a second anchor 35 is positioned within bore 36 of a second member 38. Generally, in this type of application at least one member, either 34 or 38, is movable and the other is fixed. Thus, the two oppositely disposed anchors 30 and 35 are axially aligned with each along line a—a.

To mount anchor 36 so as to be readily adjustable, the body of the anchor 35 passes freely through bore 36, which is not threaded, and is held therein by a pair of nuts 40 and 42, respectively, nut 40 being disposed on one side of the member 38 and the other nut 42 being disposed adjacent the opposite side thereof.

Coil tension spring 44 is then attached to head member 45 of anchor 30 at one end thereof and attached also to head member 46 of anchor 35 at the opposite end thereof.

Once this is accomplished, the nuts 40 and 42 are positioned along the threaded body of anchor 35, so as to move the anchor 35 longitudinally along said axis a—a thereof. Therefore, the tension of coil spring 44 can be minutely adjusted through nuts 40 and 42, without the need to remove or disconnect spring 44.

Referring now to FIG. 3, there is shown a further arrangement of the axially aligned anchors which are respectively indicated at 50 and 52.

In this arrangement the supporting members 54 and 56 are provided with recesses 58 and 59, respectively. With this mode, the mounting heads 60 and 62 of anchors 50 and 52 are received in their respective recesses whereby spring 64 is the only component exposed between members 54 and 56. Thus, it can be seen that a spring of this type can be mounted in very closely spaced areas, as indicated by arrow 65.

FIG. 5 illustrates an application of the anchors indicated at 66 and 68, wherein the anchors are positioned at an angular relationship to each other. That is anchor 66 is positioned in a horizontal mode and anchor 68 is substantially vertical thereto. An example of such an application is herein shown, whereby anchor 68 is threaded to lever arm member 70 through threaded hole 72, the lever arm having a cam follower 74 which engages cam member 75, forcing lever arm 70 to oscillate about pivot pin 76. The adjustment of either or both anchors 66 and 68 will react on the amount of tension being applied by spring 78.

Still a further arrangement can be established, such as a tandem spring hookup, illustrated in FIG. 4. Tandemly arranged are four anchors 80, 81, 82, and 83. Anchors 80 and 81 are secured to an overhead movable member 84 and extend laterally outwardly therefrom, with the springs attached to their respective mounting heads 85 and 86. The springs 88 and 90 are then attached to corresponding heads 92 and 93 of respective anchors 82 and 83, said anchors 82 and 83 being mounted in the fixed structure 96.

Accordingly, many more variations can be devised from the present invention.

FIG. 6 illustrates an anchor 10 having both ends provided with mounting heads 18a and 18b for which additional applications can readily be designed.

Again, it is also contemplated that instead of the body 12 being provided with threads, the body 12a as shown in FIGS. 7 and 8 can be formed with a plurality of annular grooves 14a, wherein a conventional snap ring 15 may be received therein, as is well known in this type of fastening means.

FIG. 7 shows the snap ring 15 as forceably abutting the side of member 17. The tension of spring 19 is then controlled by the use of a particular groove 14a.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. An adjustable tension spring anchor in combination with a tension spring, wherein the anchor is arranged for mounting in both a fixed and a movable structure, said anchor comprising:

an elongated cylindrical body member;

an adjustable securing means disposed along said body member, wherein said adjustable securing means comprises a threaded surface formed throughout the cylindrical body portion thereof, wherein the tension of said spring is adjustable to a predetermined condition;

a mounting head having an aperture disposed therein to receive one end of the tension spring, and formed as an integral part of said cylindrical body member.

2. The combination as recited in claim 1, including a pair of anchors axially aligned relative to each other, the first anchor being mounted in a fixed structure and the second anchor being mounted in a movable structure, wherein the respective mounting heads of each anchor are oppositely disposed to each other, having the tension spring mounted therebetween, and at least one of said anchors being adjustable within a structure to control the spring tension therebetween.

3. The combination as recited in claim 2, wherein the first anchor is threadably received in one of said structures, the other of said structures having a hole disposed therein, wherein the second anchor is freely received through said hole, and wherein said second anchor includes a pair of nut members threaded thereto, having each nut positioned adjacent opposite sides of said structure for adjusting said second anchor longitudinally along the axis thereof, whereby the tension of said spring is accurately controlled thereby.

4. The combination as recited in claim 2, wherein each of said structures includes a threaded bore having enlarged recesses disposed therein, and wherein said mounting heads of said anchors are arranged to be received in said recesses, said anchors being prevented from extending outwardly from the adjacent surface of each structure.

5. The combination as recited in claim 1, including a first anchor adjustably mounted to the fixed structure and a second anchor adjustably mounted to the movable structure, wherein the longitudinal axis of said first anchor is angularly displaced with respect to the axis of said second anchor and wherein the mounting heads of each anchor are oppositely disposed to the other, having the tension spring mounted therebetween.

6. The combination as recited in claim 1, including a first and second anchor adjustably mounted to the movable structure in an end-to-end relation and laterally extending outwardly therefrom, the respective mounting heads of said first and second anchors being positioned outwardly of said structure; and a third and fourth anchor are adjustably mounted to the fixed structure perpendicular to said first and second anchors, whereby the mounting heads of the respective anchors are oppositely disposed to the other heads; and wherein a tension spring is mounted between each opposing mounting head.

7. The combination as recited in claim 2, wherein said adjustable securing means comprises:
 a plurality of annular grooves formed along the length of said cylindrical body member; and
 a snap ring arranged for locking engagement with said grooves of said body member.

8. The combination as recited in claim 1, wherein the anchor includes a pair of oppositely disposed mounting heads, each being integrally formed on each end of said body member thereof, wherein each mounting head includes a centrally disposed aperture.

* * * * *